United States Patent [19]
Fujimoto et al.

[11] Patent Number: 5,696,415
[45] Date of Patent: Dec. 9, 1997

[54] ELECTRIC ROTARY MACHINE

[75] Inventors: Hirofumi Fujimoto, Edgware, England; Kazuyoshi Konaya, Kariya; Hiroshi Sakakibara, Chita-gun, both of Japan

[73] Assignee: Nippondenso Co., Ltd., Japan

[21] Appl. No.: 447,818

[22] Filed: May 23, 1995

[30] Foreign Application Priority Data

Jun. 7, 1994 [JP] Japan ............... P6-125139

[51] Int. Cl.$^6$ ............... H02K 5/00; H02K 1/32
[52] U.S. Cl. ............... 310/89; 310/91; 310/64
[58] Field of Search ............... 310/62, 63, 58, 310/89, 51, 91, 64, 65

[56] References Cited

U.S. PATENT DOCUMENTS

| | | |
|---|---|---|
| 5,028,826 | 7/1991 | Kitamura . |
| 5,194,770 | 3/1993 | Yoshioka et al. . |
| 5,233,255 | 8/1993 | Kusumoto et al. ............... 310/263 |
| 5,235,229 | 8/1993 | Tanaka et al. ............... 310/62 |
| 5,237,230 | 8/1993 | Sugiyama et al. ............... 310/113 |
| 5,241,230 | 8/1993 | Tanaka et al. ............... 310/62 |
| 5,250,864 | 10/1993 | Kusumoto et al. ............... 310/58 |
| 5,315,195 | 5/1994 | Bradfield et al. . |
| 5,317,224 | 5/1994 | Ragaly ............... 310/58 |
| 5,532,534 | 7/1996 | Baker et al. ............... 310/89 |

FOREIGN PATENT DOCUMENTS

| | | |
|---|---|---|
| 4028464 | 2/1992 | Germany . |
| 56-129548 | 10/1981 | Japan . |
| 2-42064 | 11/1990 | Japan . |
| 5-50969 | 7/1993 | Japan . |

Primary Examiner—Steven L. Stephan
Assistant Examiner—Michael J. Wallace, Jr.
Attorney, Agent, or Firm—Cushman Darby & Cushman Intellectual Property Group of Pillsbury Madison & Sutro, LLP

[57] ABSTRACT

A front frame and a rear frame of an alternator house a rotor and a stator therein and are secured by through bolts and nuts to each other in an axial direction at supports which are formed on the circumferential portion of the frames. Cooling air intake windows are formed on the end surfaces of the frames and cooling air discharging windows are formed on the circumferential surfaces of the frames. Window ribs formed between the discharging windows are arranged so that the ribs adjacent to the supporting portions have a width which is greater than the width of other ribs, thereby providing sufficient rigidity to suppress resonant vibrations and the generation of magnetic noise which occurs when the armature reaction of the alternator is transmitted from the stator to the entirety of the frames.

15 Claims, 8 Drawing Sheets

ELECTRIC ROTARY MACHINE

CROSS REFERENCE TO RELATED APPLICATION

The present application is based on and claims priority from Japanese Patent Application No. Hei 6-125139 filed on Jun. 7, 1994, the contents of which are incorporated herein by reference.

BACKGROUND OF THE INVENTION

1. Field of the Invention

The present invention relates to an alternator for a vehicle.

2. Description of the Related Art

In an alternator for a vehicle, magnetic noise is generated by a stator or the like under magnetic vibration. The magnetic noise is amplified due to resonance of the alternator frame, particularly in a relatively low rotational speed range (e.g., 1500–4000 RPM) and may feel harsh to the driver and passengers of the vehicle.

In order to prevent such magnetic noise, the structure shown in FIGS. 10 and 11 has been proposed in which the rigidity of front and rear frames 100 and 200 of an alternator is increased by increasing the thickness of the peripheral walls 110 and 210 of the frames 100 and 200.

However, if the thickness of the peripheral walls 110 and 210 of the frames 100 and 200 is increased in order to provide higher rigidity, the weight and size of the alternator are also increased.

SUMMARY OF THE INVENTION

The present invention is made in view of the foregoing problems, and has a main object of providing an electric rotary machine which generates reduced magnetic noise without increasing the weight and size of the rotary machine.

This object is achieved by providing rigid supports on the circumferential portion of the front and rear frames to receive all fastening forces from nut and bolt connections and by providing reinforced window ribs adjacent to the supports. The reinforced ribs have greater rigidity than the rest of the ribs formed between cooling windows.

Another object of the present invention is to provide reinforced ribs adjacent to the supports (hereinafter referred to as adjacent ribs) which have greater circumferential width than the rest of the ribs.

Another object of the present invention is to provide adjacent ribs which have a greater axial thickness than the rest of the ribs.

A further object of the present invention is to provide adjacent ribs which have a greater radial thickness than the rest of said ribs; and A further object of the present invention is to provide adjacent ribs which have thicker bent portions extending from the radial direction to the axial direction than do the rest of the ribs.

One or both of the frames may preferably incorporate these features.

In an electric rotary machine according to the present invention, magnetic vibrations generated in a stator during rotation of a rotor are transmitted to fastening members such as bolts and nuts used as supports. In this way, the magnetic vibrations are absorbed by adjacent window ribs. Since the magnetic vibrations are absorbed by the adjacent ribs, resonant vibration of the frames is suppressed, thereby reducing magnetic noise. In the present invention, only a part of the window ribs are reinforced to enhance rigidity. Therefore, effective reduction of the magnetic noise is attained without significantly increasing the weight and size of the rotary machine.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments according to a first embodiment of the present invention will now be described with reference to FIGS. 1 through 4.

Figure 3:
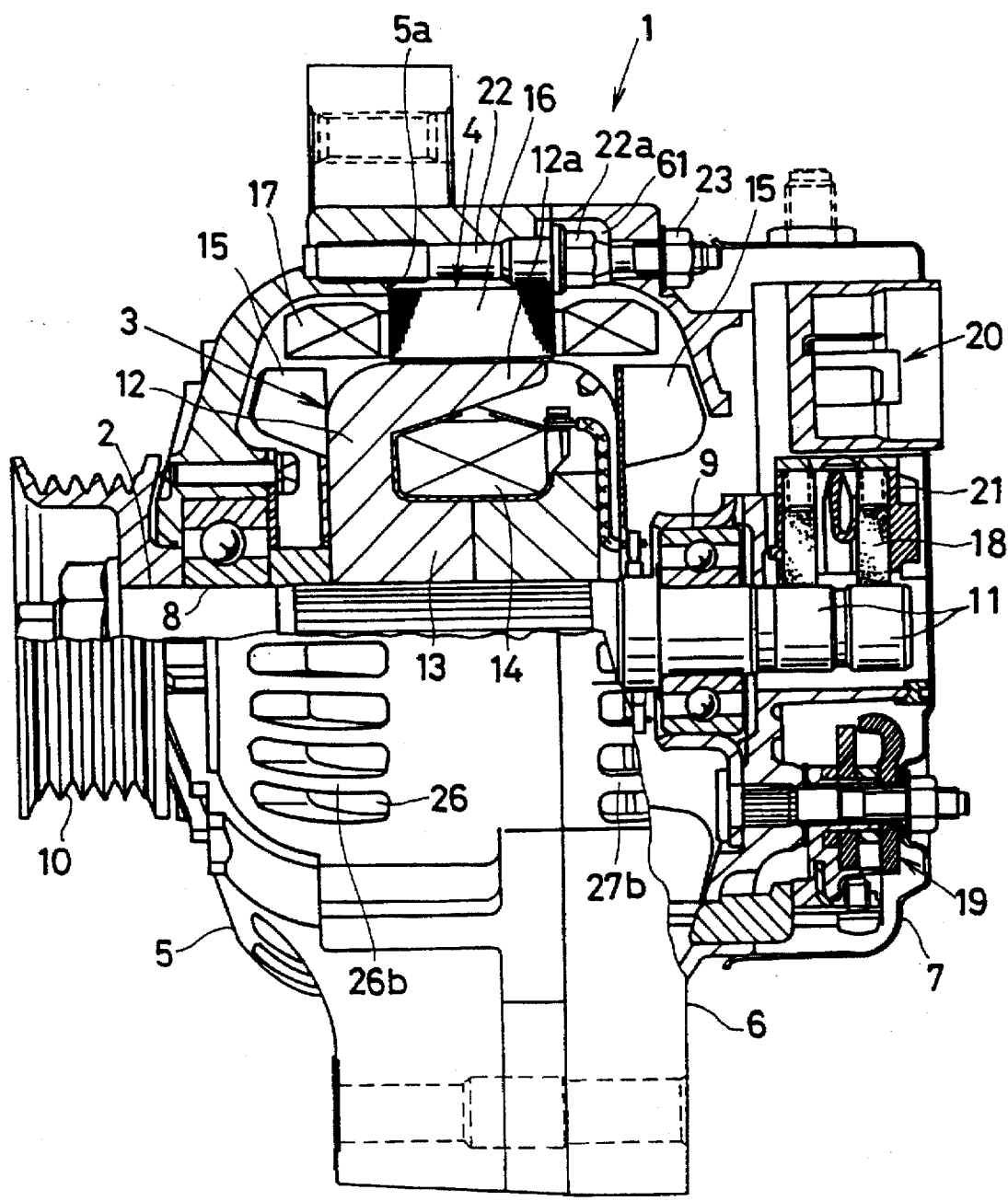
FIG. 3 is a partially cross-sectional side view illustrating an alternator according to the first embodiment.

As shown in FIG. 3, an alternator 1 according to a first embodiment of the present invention consists of a rotor 3 having a rotary shaft 2, a stator 4 disposed around the rotor 3, a front frame 5 and a rear frame 6, both of which accommodate the rotor 3 and the stator 4, and a rear cover 7.

The rotary shaft 2 is rotatably supported by bearings 8 and 9 on the front frame 5 and the rear frame 6 and extends from those frames. One end of the rotary shaft 2 extending from the front frame 5 has a pulley 10. An engine driving force is transmitted to the pulley 10 through a belt (not shown) to rotate the rotor 3. The other end of the rotary shaft 2 extending from the rear frame 6 has a pair of slip rings 11 to be rotatable together.

In addition to the rotary shaft, the rotor 3 is composed of a pole core 12 having a plurality of claw poles 12a on its peripheral portion, a cylindrical yoke (not shown) formed in the center of the pole core and a field coil (not shown). The pole 12 and the yoke may be formed as a unit by forging.

Cooling fans 15 are fixed to both sides of the pole core 12 and rotate along with the rotor 3 to take cooling air in through the front and rear frames 5 and 6.

The stator 4 is composed of a stator core 16 and a stator coil 17 wound on the stator core 16. The stator core 16 is made of a plurality of laminated thin annular iron plates and is press-fitted into the inner periphery of the front frame 5 around the pole core 12. The stator core 16 is seated on a step portion 5a which is formed on the inner periphery of the front frame 5.

The stator coil 17 is wound in a Y or Δ connection and inserted in a plurality of slots (not shown) formed in the inner periphery of the stator core 16.

A rear cover 7 is secured to the rear frame 6 and protects brushes 18, a rectifying unit 19, a regulator and the like which are disposed outside the rear frame 6. The brushes 18 are held in a brush holder 21 and biased against the outer periphery of the slip rings 11.

Figure 1:
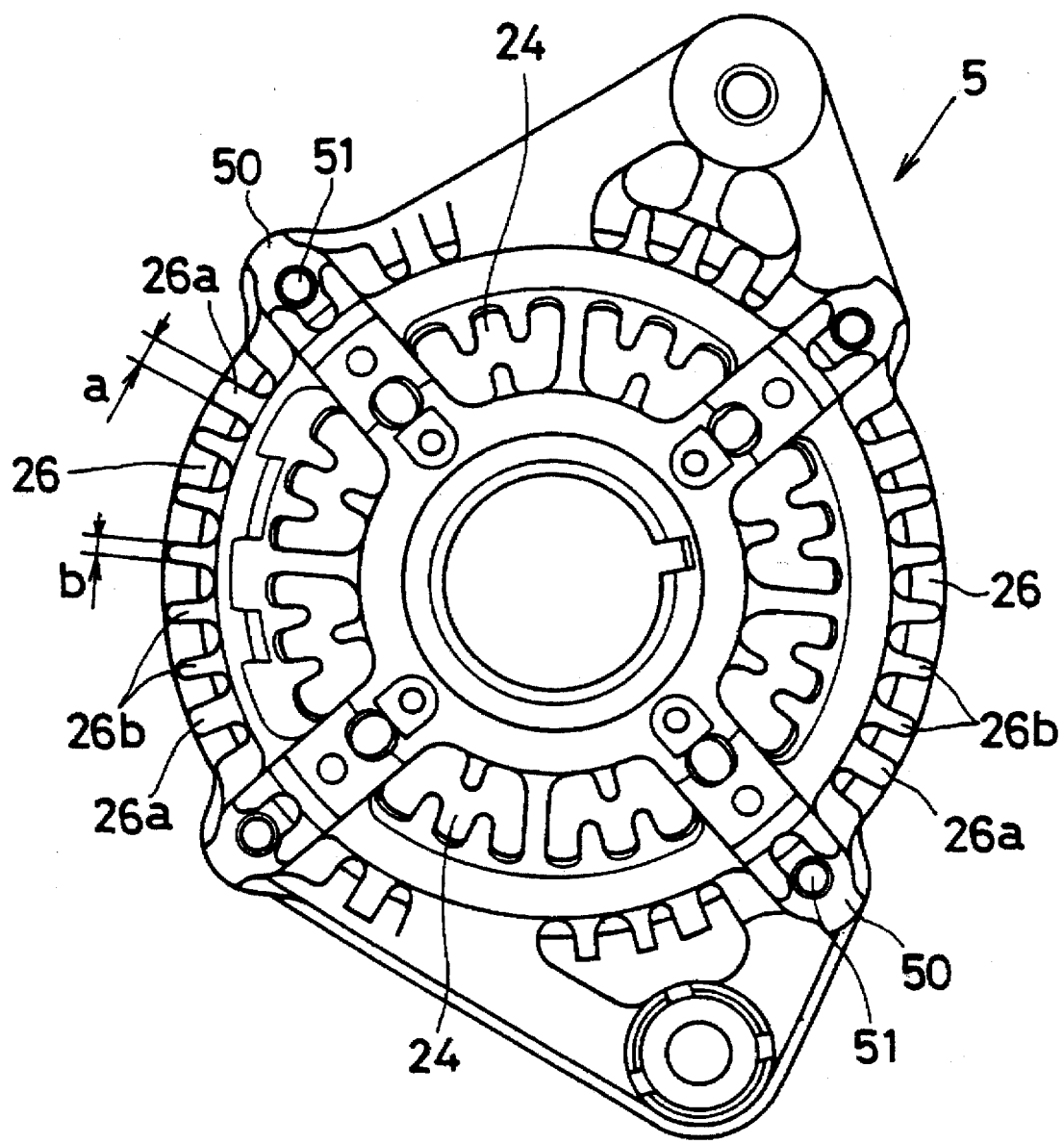
FIG. 1 is a front view of a front frame of an alternator according to a first embodiment of the present invention.

The front frame 5 and the rear frame 6 have respective supports 50 and 60 formed on four corresponding locations on the outer circumference of the frames to receive through bolts 22. The front frame supports 50 have threaded holes 51 as shown in FIG. 1 and the rear frame supports 60 have recesses 61 as shown in FIG. 3 to receive washer-based nuts 22a, and through holes 62 for receiving the rear portions of the through bolts 22. The front frame 5 and the rear frame 6 are fastened by a plurality of through bolts 22 and nuts 23.

The washer based nuts 22a of the through bolts 22 press on one end of the stator core 16, the other end of which is press-fitted into the inner periphery of the front frame 5 as the through bolts 22 are screwed into the threaded hole 51 and seat the stator core 16 on a step portion 5a of the front frame 5.

Figure 2:
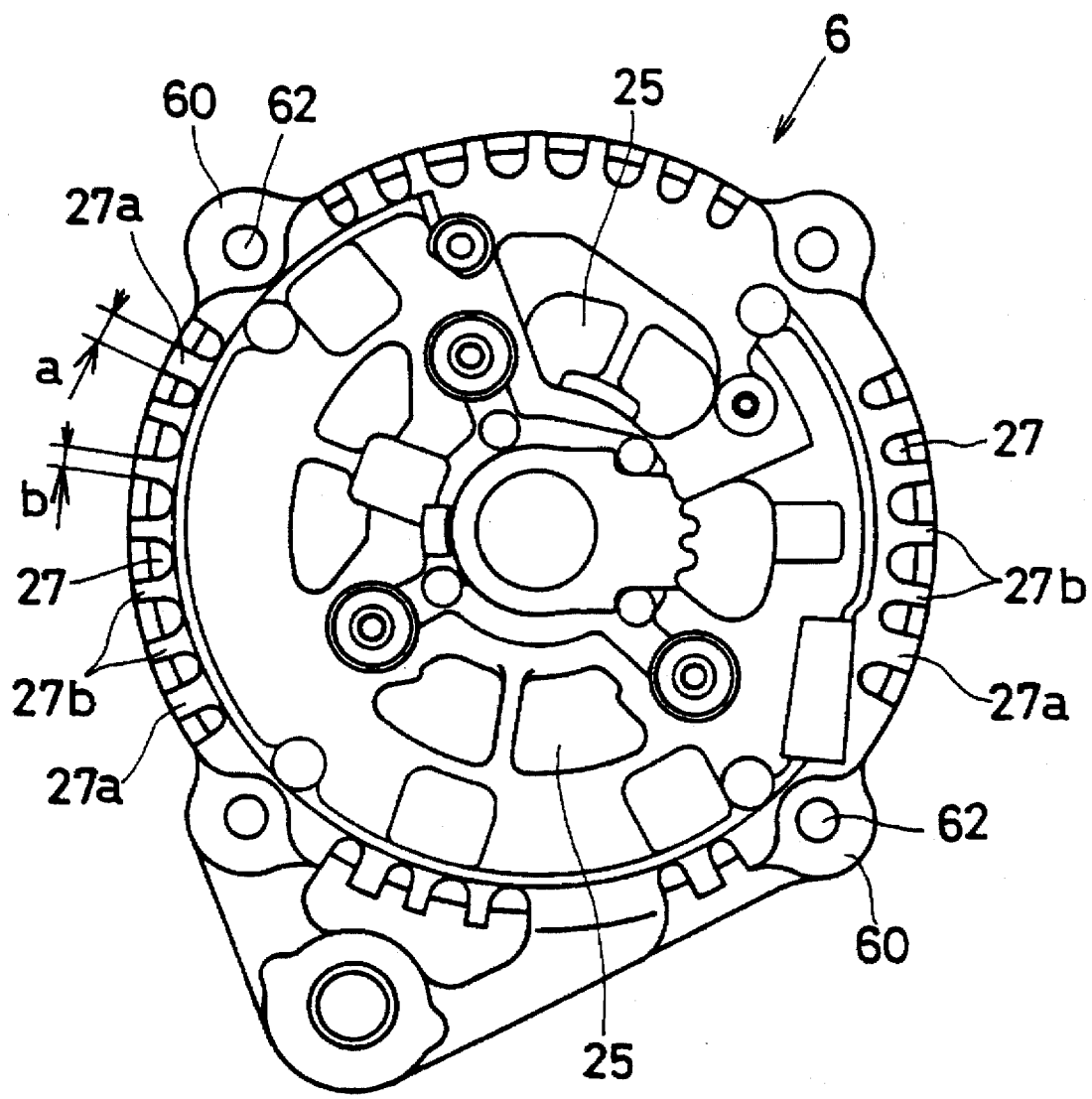
FIG. 2 is a front view of a rear frame of the embodiment shown in FIG. 1.

Cooling air intake windows 24 and 25 (shown in FIGS. 1 and 2) are formed on the end surfaces of the front frame 5 and the rear frame 6 to open in an axial direction thereof so that cooling air flow is generated by rotation of the cooling fans 15. A plurality of cooling air discharge windows 26 and 27 are formed on the circumferential surface of the respective frames 5 and 6 to open in a radial direction thereof. The cooling air discharge windows 26 and 27 are shaped into ellipses with their long axes oriented in the axial direction of the alternator. Reinforced window ribs 26a and 27a, and other window ribs 26b and 27b formed between the cooling windows 26 and 27. The reinforced window ribs 26a and 27a are formed adjacent to the supports 50 and 60 and have the width 'a' which is greater than the width 'b' of the rest of the window ribs, as illustrated in FIG. 1 and FIG. 2. The width 'a' is preferably about 1.2 to 3.0 times as wide as the width 'b'. Thus, the rigidity of the window ribs (adjacent ribs) 26a and 27a adjacent to the supporting portion 50 and 60 provides sufficient rigidity to prevent transmission of magnetic vibrations generated in the stator 4 to the entirety of the frames 5 and 6.

Next, operation of this embodiment will be explained.

When an engine runs, driving force is transmitted through a V belt (not shown) to the pulley 10 to rotate the rotary shaft 2. An electric current is supplied from outside through the brushes and the slip rings to energize the field coil 14. As a result, the claw poles 12a of the pole core 12 become polarized so that an alternating output current is generated in the stator coil 17 while the rotor 3 rotates.

Magnetic vibrations generated due to armature reaction of the stator 4 are transmitted through the through bolts 22 and the supports 50 and 60 to the entirety of the frame.

Since there are reinforced adjacent ribs 26a and 27a provided in the path of the magnetic vibration, the magnetic vibrations transmitted through the supports 50 and 60 are absorbed by the adjacent ribs 26a and 27a. Since the magnetic vibrations transmitted from the supporting portion to the rest of the frames is reduced, magnetic noise is reduced.

Figure 4:
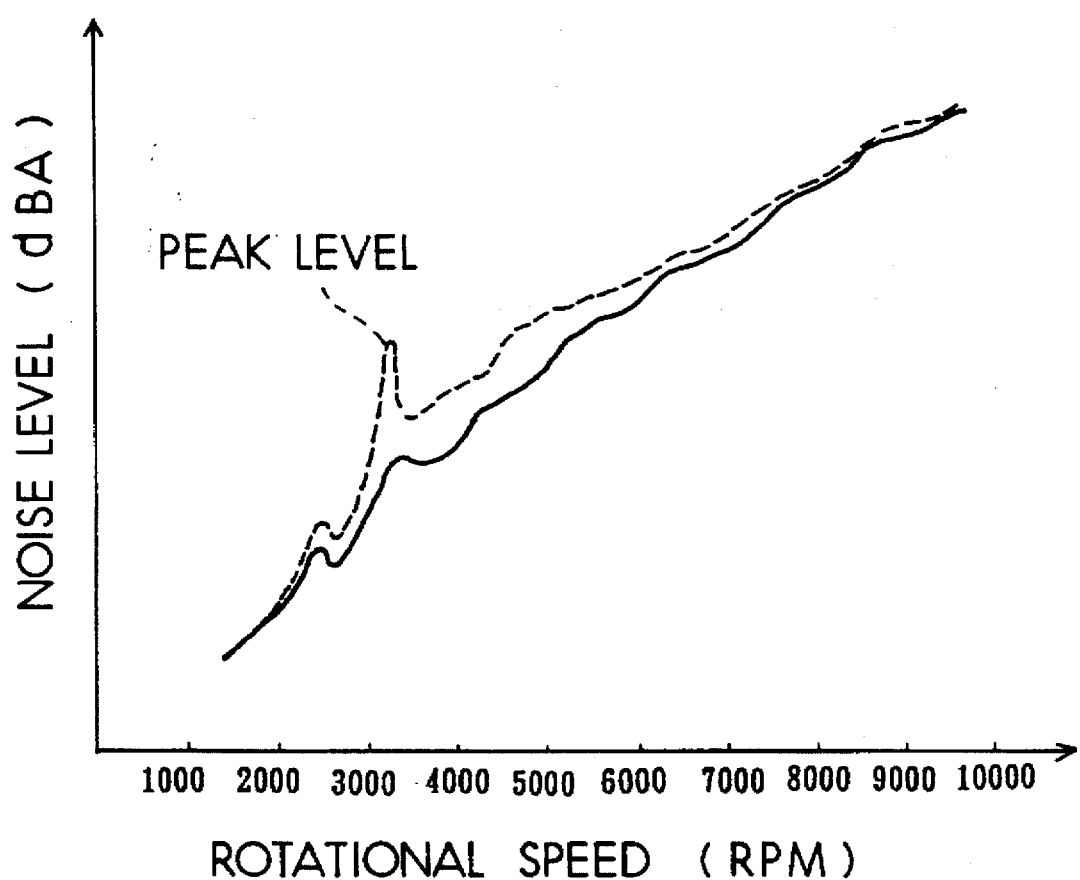
FIG. 4 is a graph showing a relationship between rotational speed and noise level in a rotary machine.

Particularly, since the magnetic vibration transmitted through the supporting 50 and 60 to the entirety of the frames is reduced and resonant vibrations of the frames are suppressed, the peak level of the magnetic noise generated in the low rotational range may be effectively reduced as indicated by a solid line shown in FIG. 4. The graph in FIG. 4 shows noise level relative to rotational speed, and the solid line indicates the noise level generated by the present embodiment when the cross-sectional area of the window ribs 26a and 27a is about 1.3 times that of other ribs, and the broken line indicates the noise level of a prior art device in which the cross-sectional areas of the window ribs adjacent to the supports are equal to the cross-sectional areas of other window ribs.

In the embodiment, since only the adjacent ribs 26a and 27a are reinforced in the above mentioned manner, excessive increase in weight and size is eliminated and :greater ease of installation and reduced fuel consumption are maintained when compared to a conventional device in which all ribs are reinforced and thickened.

A second embodiment will be described next.

Figure 5:
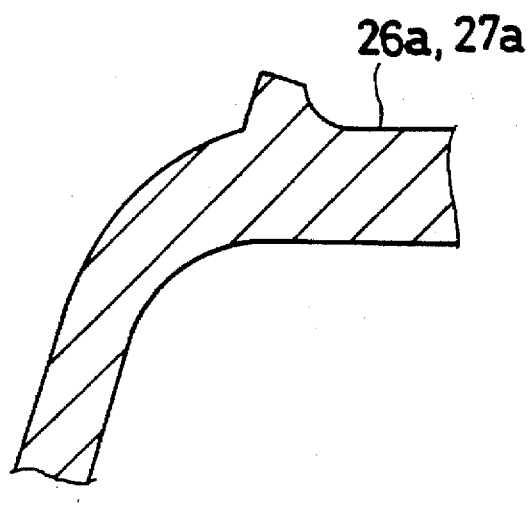
FIG. 5 is a cross-sectional view illustrating a reinforced window rib adjacent to a support according to a second embodiment of the present invention.

FIG. 5 is a cross-sectional view of an adjacent rib 26a or 27a.

Figure 9:
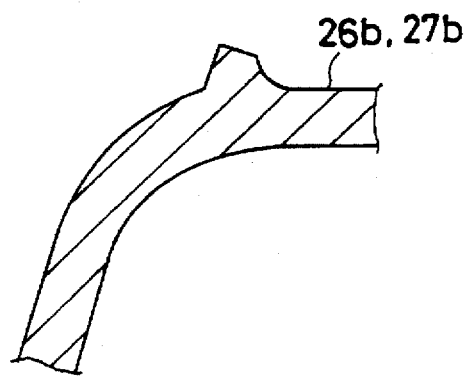
FIG. 9 is a cross-sectional view illustrating a window rib which is not reinforced.
Figure 10:
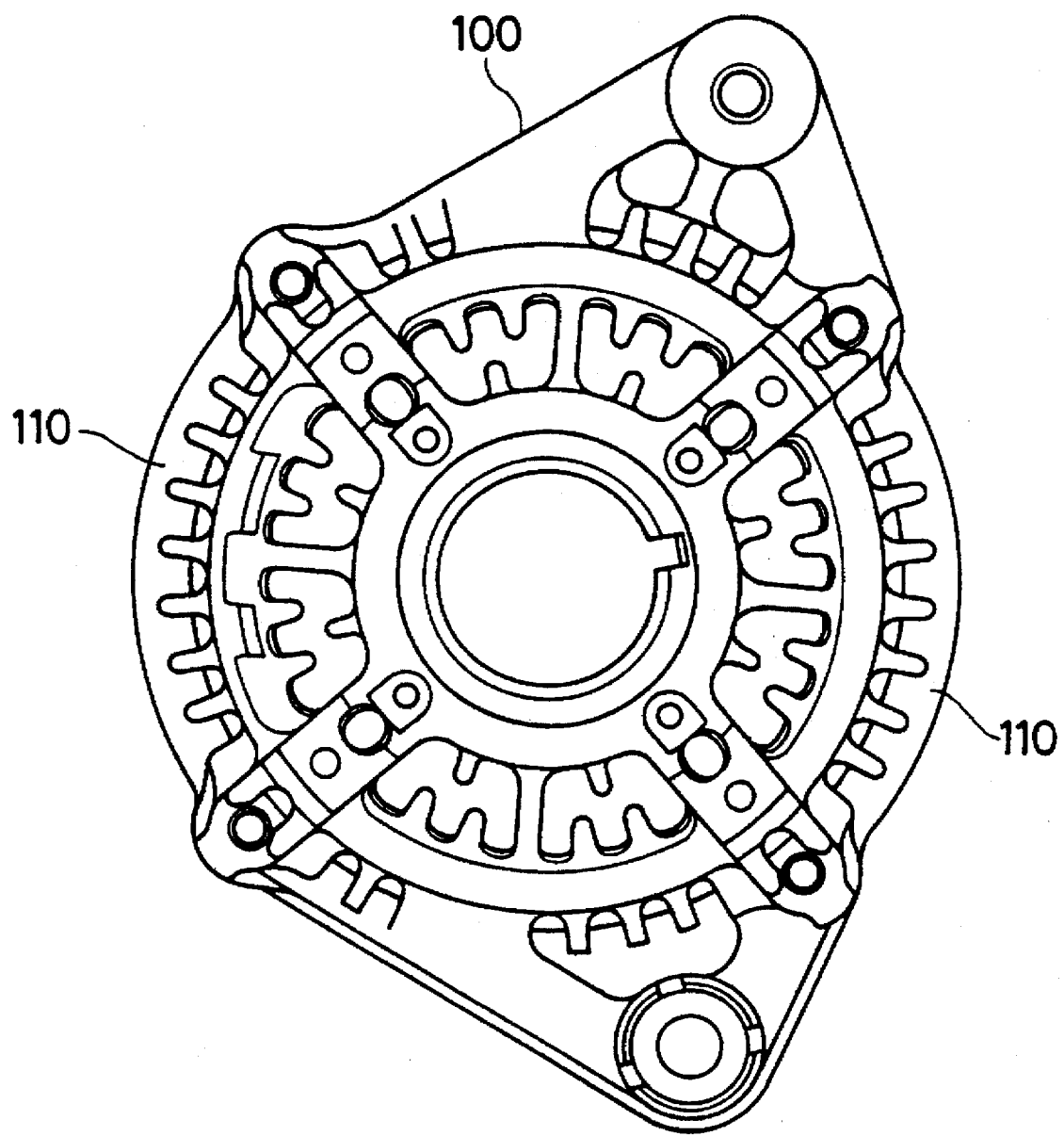
FIG. 10 is a front view illustrating a prior art front frame.
Figure 11:
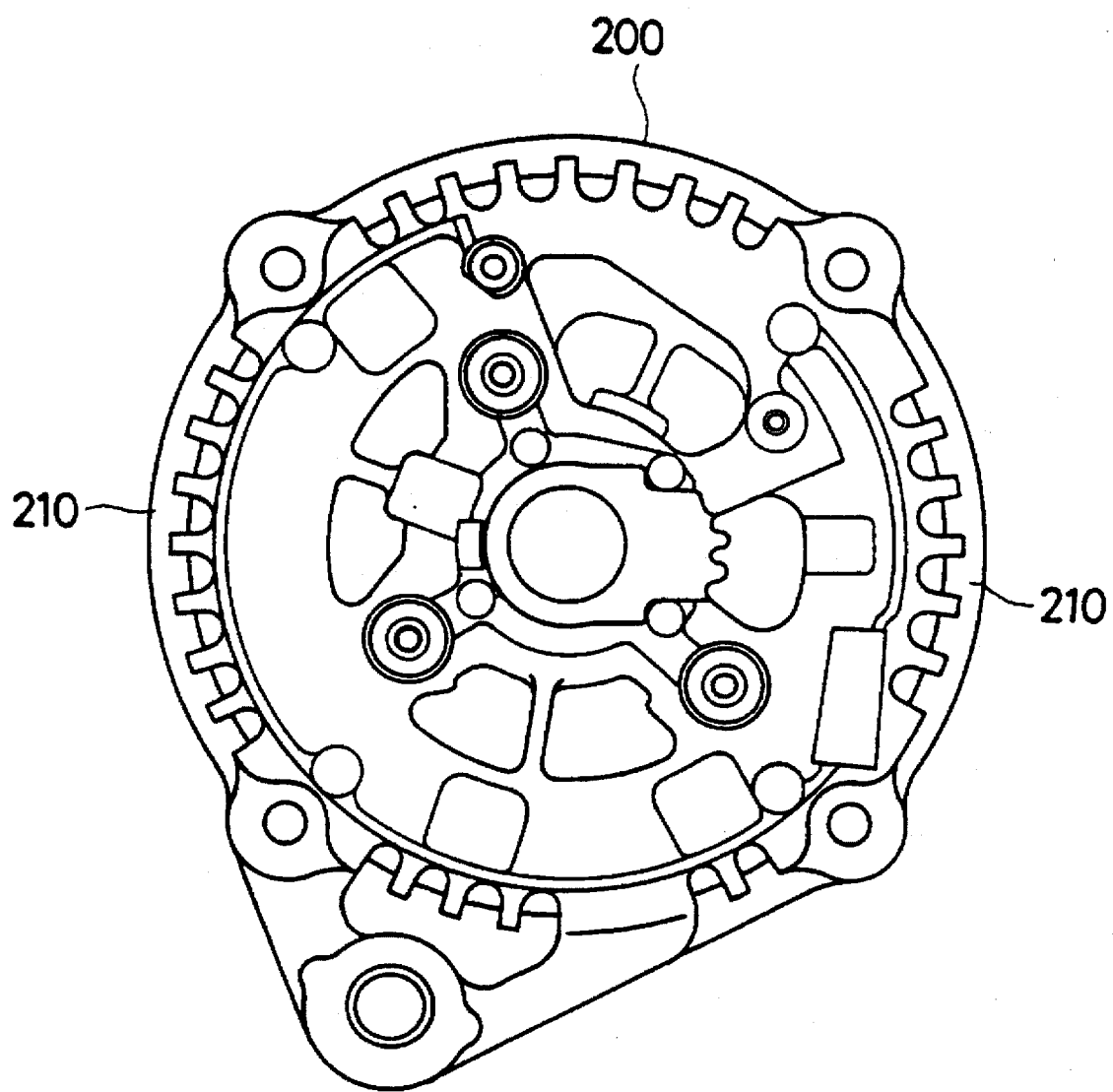
FIG. 11 is a front view illustrating a prior art rear frame.

While in the first embodiment, the width 'a' of the adjacent ribs 26a and 27a is greater than other window ribs 26b and 27b, the thickness in the radial direction (the vertical direction in FIG. 5) of the adjacent ribs 26a and 27a is greater than other window ribs 26b and 27b one of which is shown in FIG. 9.

A third embodiment of the present invention will be explained next.

Figure 6:
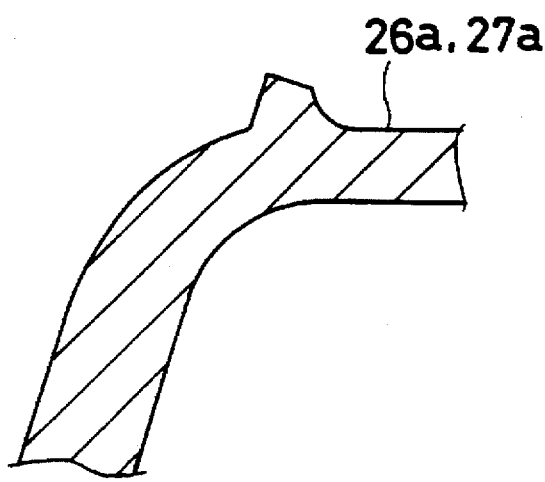
FIG. 6 is a cross-sectional view illustrating a reinforced window rib adjacent to a support according to a third embodiment of the present invention.

FIG. 6 is a cross-sectional view of an adjacent rib 26a or 27a.

As shown in FIG. 6, the adjacent ribs 26a and 27a are thicker in the axial direction (horizontal direction in FIG. 6) than other window ribs 26b or 27b one of which is shown in FIG. 9.

A fourth embodiment of the present invention will be explained next.

Figure 7:
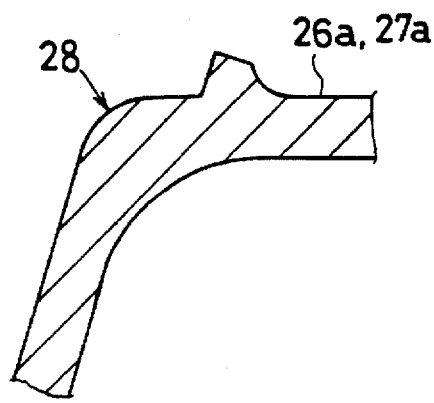
FIG. 7 is a cross-sectional view illustrating a reinforced window rib adjacent to a support according to a fourth embodiment of the present invention.

FIG. 7 is a cross-sectional view of an adjacent rib 26a or 27a.

As shown in FIG. 7, the adjacent ribs 26a and 27a are thicker at a bend 28 bending from the radial direction to the axial direction than the bends of other ribs 26b and 27b one of which is shown in FIG. 9. In this embodiment, in order to have an appropriate clearance between the coil 17 and the frames 5 and 6 around the bends 28, the radius the bend is decreased to provide the thicker bend 28.

A fifth embodiment of the present invention will be explained next.

Figure 8:
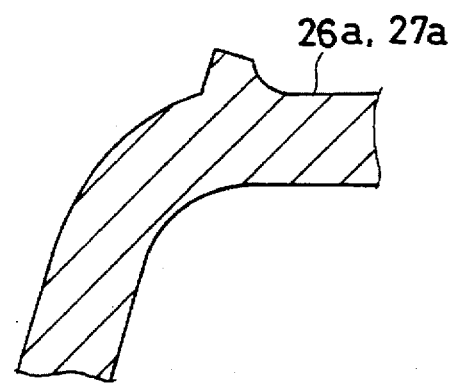
FIG. 8 is a cross-sectional view illustrating a reinforced window rib adjacent to a support according to a fifth embodiment of the present invention.

FIG. 8 is a cross-sectional view of an adjacent rib 26a or 27a.

As shown in FIG. 8, the adjacent ribs 26a and 27a are thicker over the whole rib body than other ribs.

In the embodiments 2 through 5 described above, the width 'a' of the adjacent ribs 26a and 27a may be made equal to the width 'b' of other ribs 26b and 27b, however it may be made greater than the width 'b' of others 26b and 27b to enhance the rigidity of the window ribs 26a and 27a further.

[Variation]

In the above embodiments, only the adjacent ribs 26a and 27a are reinforced to have more rigidity than other window ribs 26b and 27b, however, the window ribs 26b and 27b which are closer to the supports 50 and 60 may be made to have more rigidity than the rest of the ribs. In this case, the adjacent ribs 26a and 27a which are closest to the supports 50 and 60 are most rigid.

Although in the first embodiment all the adjacent ribs 26a and 27a are reinforced to increase the rigidity, either one of the adjacent rib 26a or 27a of either front or rear frame 5 or 6 may be reinforced to increase the rigidity.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An electric rotary machine including a rotor rotatably disposed within front and rear frames, a cooling fan fixed to an axial side of said rotor, a stator disposed around said rotor, and fastening members for axially fastening said frames together, wherein at least one of said frames accommodates said cooling fan therein and comprises:

an axial end wall portion rotatably supporting said rotor and having cooling air intake windows for said cooling fan;

a circumferential wall portion;

a plurality of support portions provided on and extending radially from said axial end wall portion and provided on and extending axially from said circumferential wall portion, said support portions on said circumferential wall portion receiving said fastening members and dividing said circumferential wall portion into a plurality of regions;

a stay portion disposed between two of said support portions, on one of said regions; and a plurality of ribs disposed on said circumferential wall portion, said ribs defining a plurality of axially extending cooling air discharge windows, said ribs including a reinforced rib having a greater rigidity than a rigidity of other ones of said ribs, said reinforced rib being disposed on one of said regions other than said region having said stay portion and defining a cooling air discharge window cooperatively with one of said support portions defining said one of said regions other than said region having said stay portion.

2. An electric rotary machine according to claim 1, further comprising a secondary reinforced rib disposed on said region having said stay portion adjacent to said support portion so that said reinforced rib and said secondary reinforced rib are disposed on opposite sides of said support portion.

3. An electric rotary machine according to claim 1, wherein said cooling air intake windows are elongated in an angular direction corresponding to a plurality of said ribs including said reinforced rib.

4. An electric rotary machine according to claim 1, wherein said reinforced ribs comprise ribs having a cross-sectional area which is about 1.2 to 3.0 times that of said other ribs.

5. An electric rotary machine according to claim 1, wherein said reinforced ribs have a greater circumferential width than said other ribs.

6. An electric comprise machine according to claim 1, wherein said reinforced rib have a greater axial thickness than said other ribs.

7. An electric rotary machine according to claim 1, wherein said reinforced ribs have a greater radial thickness than said other ribs.

8. An electric rotary machine according to claim 1, wherein said reinforced ribs comprise bent portions extending from a radial direction to an axial direction which are thicker than those of said other ribs.

9. An electric rotary machine according to claim 1, wherein said reinforced ribs comprise ribs which are thicker and wider than said other ribs.

10. An electric rotary machine including a rotor rotatably disposed within front and rear frames, a cooling fan fixed to an axial side of said rotor, a stator disposed around said rotor, and fastening members for axially fastening said frames together, wherein at least one of said frames accommodates said cooling fan therein and comprises:

an axial end wall portion rotatably supporting said rotor and having cooling air intake windows for said cooling fan;

a circumferential wall portion;

a plurality of support portions provided on and extending radically from said axial end wall portion and provided on and extending axially from said circumferential wall portion, said support portions on said circumferential wall portion receiving said fastening members and dividing said circumferential wall portion into a plurality of regions;

a stay portion disposed between two of said support portions, on one of said regions; and a plurality of ribs disposed on said circumferential wall portion, said ribs defining a plurality of axially extending cooling air discharge windows and including a reinforced rib having a greater cross-sectional area than that of other ones of said ribs, said reinforced rib being disposed on one of said regions other than said region having said stay portion and adjacent to said support portion defining said one of said regions other than said region having said stay portion to thereby cooperatively define a cooling air discharge window with said one of said support portions.

11. An electric rotary machine according to claim 10, further comprising a secondary reinforced rib disposed on said region having said stay portion adjacent to said support portion so that said reinforced rib and said secondary reinforced rib are disposed on opposite sides of said support portion.

12. An electric rotary machine according to claim 10, wherein said cooling air intake windows are elongated in an angular direction corresponding to a plurality of said ribs including said reinforced rib.

13. An electric rotary machine including a rotor rotatably disposed within front and rear frames, a cooling fan fixed to an axial side of said rotor, a stator disposed around said rotor, and fastening members for axially fastening said frames together, wherein at least one of said frames accommodates said cooling fan and comprises:

an axial end wall portion rotatably supporting said rotor and having cooling air intake windows for said cooling fan;

a circumferential wall portion;

four support portions provided on and extending radically from and provided on and extending axially from said circumferential wall portion, said support portions on said circumferential wall portion receiving said fastening members and dividing said circumferential wall portion into four regions;

two stay portions disposed between respective two of said support portions, on diagonally opposite ones of said regions; and a plurality of ribs disposed on said circumferential wall portion, said ribs defining a plurality of axially extending cooling air discharge windows including at least four reinforced ribs each having a greater cross-sectional area than that other ones of said ribs, said four reinforced ribs being disposed on the two of said regions other than said regions having said stay portions disposed thereon and adjacent to one of said support portions defining said regions other than said regions having said stay portions to cooperatively define cooling air discharge windows with said respective support portions.

14. An electric rotary machine according to claim 13, further comprising secondary reinforced ribs disposed on said regions having said stay portions, said secondary reinforced ribs being disposed adjacent to said support portions so that one each of said reinforced ribs and said secondary reinforced ribs are respectively disposed on opposite sides of said support portions.

15. An electric rotary machine according to claim 13, wherein said cooling air intake windows are elongated in an angular direction corresponding to a plurality of said ribs including one of said reinforced ribs.

* * * * *